Feb. 5, 1924.
N. JENSEN
SPARE RIM CARRIER
Filed Oct. 5, 1922
1,482,997
FIG. 1.
FIG. 2.
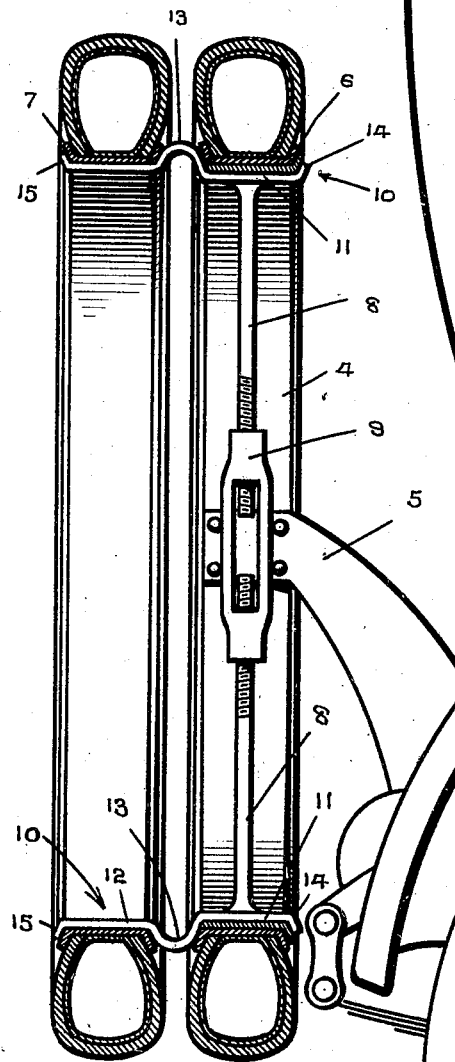
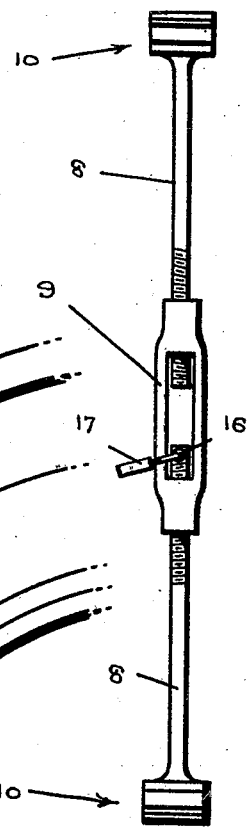
Inventor:
NELS JENSEN,
By W. J. FitzGerald & Co.
Attorney.

Patented Feb. 5, 1924.

1,482,997

UNITED STATES PATENT OFFICE.

NELS JENSEN, OF BERLIN, WISCONSIN.

SPARE-RIM CARRIER.

Application filed October 5, 1922. Serial No. 592,519.

*To all whom it may concern:*

Be it known that I, NELS JENSEN, a citizen of the United States, residing at Berlin, in the county of Green Lake and State of Wisconsin, have invented certain new and useful Improvements in Spare-Rim Carriers; and I do hereby declare the following to be a full, clear, and exact description of the invention, such as will enable others skilled in the art to which it appertains to make and use the same.

The present invention relates to tire rim carriers such as constitute equipment for motor vehicles for carrying extra or spare tires, and the invention aims to provide a simple and inexpensive device which will enable another rim to be supported from and carried by the rim carrier already provided on the automobile.

Another object is the provision of such a spare rim carrier which can be conveniently applied to the existing rim carrier and for holding an extra or spare rim in a convenient and efficient manner, in order that two spare tires can be carried.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the device as installed, showing the rims, tires and the main or primary rim carrier in vertical diametrical section.

Fig. 2 is another elevation of the device showing a lock applied.

As shown, the main or primary rim carrier 4 constitutes a band or annulus supported at the rear end of the automobile by means of brackets 5 secured to the chassis or frame thereof. The spare rim 6 containing a pneumatic tire is adapted to be slipped on and held by the carrier 4, for using such rim and tire in case of an emergency, such as the blowing out of one of the tires which are in use.

The secondary carrier forming the subject matter of this invention is for the purpose of supporting another spare or extra rim 7 in rear of or adjacent to the rim 6, with such rims and tires thereon disposed side by side.

The carrier for supporting the second spare rim 7 comprises an extensible member to be disposed diametrically within the annular carrier or band 4, preferably vertically therein, and such extensible member is composed of the lining rods or sections 8 and a turn-buckle 9 screw-threaded on the adjacent terminals thereof for expanding and contracting such extensible member.

The rods 8 have heads 10 at their opposite ends, constituting bars or strips welded or otherwise secured to the rods 8, and disposed at right angles to said rods. The heads 10 have the portions 11 to fit and bear against the inner periphery of the carrier 4, and the projecting portions 12 to fit and bear against the inner periphery of the rim 7, said portions 12 being offset outwardly away from the center. The heads 10 have the arched bends or off-sets 13 between the portions 11 and 12 to be disposed between the rim 7 and carrier 4, for spacing the rims 6 and 7 apart. The heads 10 have the bent ends 14 to engage behind the carrier 4 and the bent ends 15 to engage the edge or flange of the rim 7 opposite to the rim 6, for retaining the rim 7 on said heads.

In applying the device to support the rim 7 from the carrier 4, the device is contracted by rotating the turn-buckle 9 to move the rods 8 toward one another, so that the heads 10 can be inserted within the carrier 4 and the rim 7 placed over the portions 12. The device is then expanded by turning the turn-buckle 9 in the opposite direction, and the offset portions 12 will press outwardly against the rim 7 first, after which the portions 10 will be clamped against the carrier 4, thereby tightly holding the rim 7 as well as clamping the device in the carrier 4. The extra rim 7 is thus supported without rattling or loosening, and by contracting the device either or both of the rims 7 and 6 can be removed for use when needed.

The present carrier also enables the rims 6 and 7 to be retained in place under lock and key. Thus, one of the rods 8 has an aperture or hole 16 adjacent to its inner end for receiving the shackle of a padlock 17 which also engages the turn-buckle 9, thereby preventing said turn-buckle from being rotated, when the device is in place, and the device can, therefore, not be contracted, without first removing the padlock. The heads 10 can be sufficiently strong to resist being bent or broken off for the removal of the rim 7, without first contracting the device.

The device being composed of but few parts can be inexpensively manufactured, but is nevertheless practical and efficient for the intended purpose.

Having thus described the invention, what is claimed as new is:—

A spare rim carrier comprising aligning rods, a turn-buckle threaded on the adjacent terminals thereof, and heads secured to the opposite ends of said rods, each head having a portion to fit in and bear against a rim carrier, another portion to fit in and bear against an extra rim, an arched bend between said portions, and bent portions at the opposite ends of said portions to engage the last named carrier and rim, the second-named portion of each head being offset relatively to the first named portion of the head away from the turn-buckle.

In testimony whereof I have signed my name to this specification in the presence of two subscribing witnesses.

NELS JENSEN.

Witnesses:
J. H. PICKERT,
L. VOLKMANN.